United States Patent [19]
Meharry et al.

[11] 3,807,605
[45] Apr. 30, 1974

[54] SPRAYER WITH WHEEL PUMP

[76] Inventors: James L. Meharry, Rt. 1, Wingate, Ind. 47994; Dale K. McMillin, 9732 S. 550 W., Lafayette, Ind. 47905

[22] Filed: Apr. 6, 1973

[21] Appl. No.: 348,502

[52] U.S. Cl.................. 222/177, 239/100, 239/156
[51] Int. Cl............................................ A01c 15/00
[58] Field of Search .......... 239/155, 156, 100, 147, 239/99; 222/177

[56] References Cited
UNITED STATES PATENTS
2,703,256  3/1955  Mascaro ............................ 222/177
656,774  8/1900  Moore ................................ 239/156

*Primary Examiner*—Lloyd L. King
*Attorney, Agent, or Firm*—C. David Emhardt

[57] ABSTRACT

A portable sprayer which may be towed. The sprayer includes a frame having a pair of wheels rotatably mounted thereon. One of the wheels has a plurality of horizontally extending rollers which engage a flexible conduit mounted to the frame in a state of tension. One end of the conduit is connected by a hose to a container whereas the opposite end of the conduit is connected by another hose to a dispenser. As the sprayer is moved, the ground engaging wheels rotate causing the rollers to move against the flexible conduit thereby forcing the material from the container through the conduit towards the dispenser.

7 Claims, 2 Drawing Figures

PATENTED APR 30 1974 3,807,605

SPRAYER WITH WHEEL PUMP

BACKGROUND OF THE INVENTION

1. Field of the Invention:

This invention is in the field of pumps for spraying materials.

2. Description of the Prior Art

In the U.S. Pat. No. 315,667 issued to J. Serdinko there is disclosed a rotary force pump which is manually operated and which includes a plurality of rollers which may be moved against a flexible conduit to force material through the conduit. Two recent versions of the rotary force pump are disclosed in the U.S. Pat. No. 2,703,256 issued to A. Mascaro and No. 3,534,533 issued to Ed R. Luoma. A different type of pump which is utilized to spray material is disclosed in the U.S. Pat. No. 3,601,314 issued to Arthur A. Hurt.

A variety of materials are best dispensed by sprayers. For example, parking lanes are sprayed onto the pavement of an automobile parking lot. Likewise, various chemicals are sprayed onto lawns and fields for the control of insects and weeds. It is therefore desirable to have a sprayer which may be towed across the ground or pvavement which may be utilized to spray a variety of materials. The spraying apparatus must be capable of dispensing different amounts of material depending upon the speed which the apparatus is moved across the ground or pavement. Such an apparatus is disclosed in the aforementioned Luoma patent. Many of the prior art devices utilize various rollers and/or linkages to couple the pump of the sprayer to the ground engaging wheels. Disclosed herein is a new and improved spraying apparatus which does not require any rollers and/or linkages to couple the pump directly to the ground engaging wheels. Instead, the pump is operated directly by one of the ground engaging wheels of the apparatus thereby reducing the production cost of the apparatus as well as minimizing future maintenance problems.

In the spraying apparatus disclosed, the pumping of the material is accomplished by moving a plurality of rollers against a flexible conduit. Many of the prior art devices which utilize this type of pumping action, include three or less rollers for contacting the flexible conduit. In the apparatus disclosed herein, four rollers are utilized for contacting the flexible conduit with the result that the pumping action is smoother as compared to the prior art devices.

SUMMARY OF THE INVENTION

One embodiment of the present invention is a portable sprayer comprising a main frame having a first wheel and a second wheel rotatably mounted to the frame which directly engage ground to support the frame, the first wheel having a plurality of horizontally extending rollers mounted thereon; a container mounted on the frame for holding material to be sprayed; a material dispenser mounted on the frame; and a flexible conduit mounted to the frame in a state of tension, the conduit having a hollow interior for the material to pass through being connected at one end to the container and connected at an opposite end to the dispenser, the conduit extends downwardly adjacent the first wheel contacting at least some of the rollers and then upwardly forming a loop with the rollers projecting within the loop, the rollers contacting the conduit with rotation of the first wheel forcing the rollers to move inwardly around the loop closing the interior at each area of contact between a roller and the conduit forcing the material through the conduit ahead of each roller.

It is an object of the present invention to provide a new and improved sprayer.

It is a further object of the present invention to provide a sprayer which may be towed by another vehicle.

In addition, it is an object of the present invention to provide a sprayer which includes a pump operated directly by the ground engaging wheels of the sprayer.

Related objects and advantages of the present invention will be apparent from the following description.

DESCRIPTION OF THE PREFERRED EMBODIMENT

Figure 1:
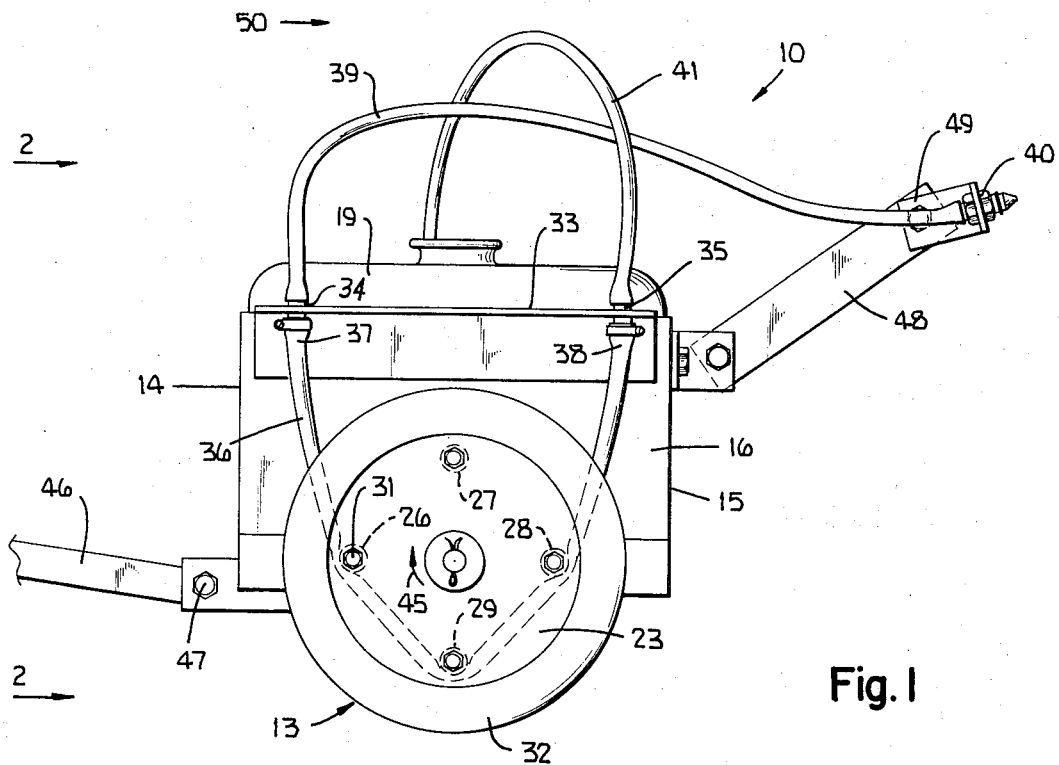
FIG. 1 is a fragmentary side view of a sprayer incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, suach alterations and further modifications in the illustrated device, and such further applications of the principles of the invention as illustrated therein being contemplated as would normally occur to one skilled in the art to which the invention relates.

Referring now more particularly to the drawings, there is shown a portable sprayer 10 having a main frame with a pair of wheels 12 and 13 rotatably mounted to the frame. The frame includes a rectangular box having four side walls 14 through 17 fixedly secured together. Side walls 14 through 17 form a rectangular configuration with an open top 18 for receipt of container 19 which holds the material to be dispensed. Secured to the bottom of the frame are a pair of right angle brackets 20 and 21 which rotatably receive axle 22. The axle passes through spacers 23 and 24 with wheels 12 and 13 mounted to the opposite ends of the axle.

Secured to rim 23 of wheel 13 are a pair of spaced apart plates 25 and 25'. The plates are positioned between side wall 16 and wheel 13. Four rollers 26 through 29 are positioned between and mounted to plates 25 and 25'. Each roller is produced from nylon and is mounted on a bolt. For example, bolt 31 extends through plates 25 and 25' and is fixedly secured to rim 23 which has a tire 32 mounted thereon.

A right angle shelf 33 is mounted to wall 16 above wheel 13. A pair of hollow fittings 34 and 35 are fixedly mounted to shelf 33. A flexible conduit 36 has a first end 37 fixedly secured to fittings 34 and a second opposite end 38 fixedly secured to fitting 35.

Figure 2:
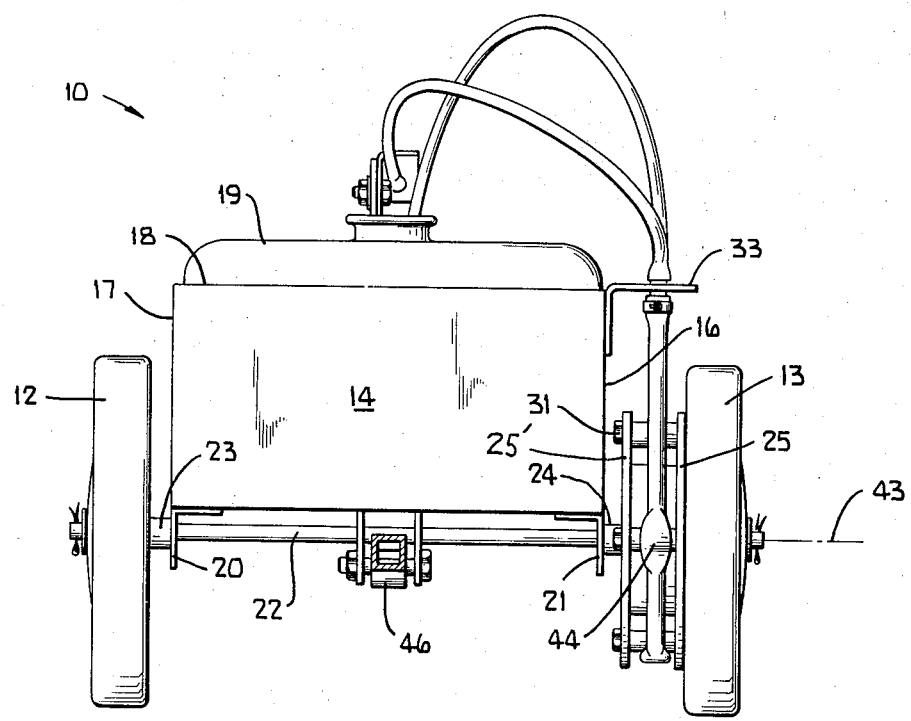
FIG. 2 is an end view looking in the direction of arrows 2—2 of FIG. 1.

Hose 39 has one end connected to fitting 34 and an opposite end connected to material dispenser 40 A second hose 41 has an end connected to fitting 35 and an opposite end connected to container 19. The flexible conduit 36 is mounted to shelf 33 in a state of tension since rollers 26 through 29 force the conduit downwardly. The conduit extends downwardly adjacent wheel 13 contacting at least some of the rollers and then upwardly forming a loop with the four rollers projecting within the loop. The spaced apart plates 25 and 25' form a guide to limit movement of the flexible conduit in a direction toward or opposite arrow 42. Rollers 26 through 29 are spaced equidistant from the axis of rotation 43 of the two wheels. Each roller is angularly positioned about axis 43 every 90° as shown in FIG. 1. As a result, at least two of the rollers are in continuous contact with the flexible conduit which may be produced from nylon. As wheel 13 rotates, the rollers move inwardly around the loop formed by conduit 36. The spacing of the rollers with respect to axis 43 and the spacing apart of the upwardly extending portions of the looped configuration of conduit 36 is such that the rollers close the hollow interior of the conduit at each area of contact between a roller and the conduit thereby forcing the material through the conduit ahead of each roller. As shown in FIG. 2, the conduit which normally has a circular cross section assumes a flat condition 44 immediately adjacent to each roller. Thus, the interior of the conduit is sealed off. As wheel 13 rotates in the direction of arrow 45, conduit 36 is sealed off by rollers 28, 29 and 26. The material trapped between rollers 28 and 29 within the conduit is thereby forced towards fitting 34. Likewise, the material within the conduit trapped between rollers 29 and 26 is forced toward fitting 34. It should be noted that the pumping action of the rollers with respect to conduit 36 is caused directly by wheel 13 which engages the ground and rotates. The four rollers are horizontal and parallel with the axis of rotation 43.

Arm 48 has a proximal end which is pivotally mounted to the frame of the apparatus. The distal end 49 of arm 48 is provided with a bracket for the mounting of spray dispenser 40. Bar 46 is pivotally mounted to the frame by fastener 47 and extends forwardly from the sprayer to facilitate the towing or pushing of the sprayer. In the embodiment shown in the drawing, hoses 39 and 41 are connected to the fittings so that movement of the sprayer in the direction of arrow 50 will cause wheel 13 to rotate in the direction of arrow 45 thereby forcing material within the container through the conduit and toward the dispenser. In order to tow sprayer 10 in a direction opposite of arrow 50, hose 41 is disconnected from fitting 35 and connected to fitting 34 whereas hose 39 is disconnected from fitting 34 and connected to fitting 35. Thus, rotation of wheel 13 in a direction opposite of arrow 45 will result in the flow of material from the container toward the dispenser.

Any type of flexible conduit may be utilized with the sprayer disclosed herein; however, excellent results have been obtained by producing the conduit from nylon surgical tubing. In the same embodiment, the rollers were nylon coated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A portable sprayer comprising:
    a main frame having a first wheel and a second wheel rotatably mounted to said frame which directly engage ground to support said frame, said first wheel having a plurality of horizontally extending rollers mounted thereon;
    a container mounted on said frame for holding material to be sprayed;
    a material dispenser mounted on said frame; and,
    a flexible conduit mounted to said frame in a state of tension, said conduit having a hollow interior for said material to pass through being connected at one end to said container and connected at an opposite end to said dispenser, said conduit extends downwardly adjacent said first wheel contacting at least some of said rollers and then upwardly forming a loop with said rollers projecting within said loop, said rollers contacting said conduit with rotation of said first wheel forcing said rollers to move inwardly around said loop closing said interior at each area of contact between a roller and said conduit forcing said material through said conduit ahead of each roller.

2. The sprayer of claim 1 wherein:
    said first wheel includes a pair of spaced apart plates mounted fixedly thereto with said rollers mounted between and to said plates, said plates forming a guide to limit movement of said flexible conduit.

3. The sprayer of claim 2 wherein:
    said frame includes a rectangular open top box for receiving said container and an axle rotatably mounted thereto, with an axis of rotation, said first wheel and said second wheel are secured to opposite ends of said axle with said plates positioned between said box and said first wheel, said frame further includes a shelf positioned above said first wheel, said shelf has a first and second hollow fitting mounted thereon each of which is connected to an opposite end of said conduit and further comprising:
    a first hose having an end connected to said first fitting and an opposite end connected to said dispenser; and,
    a second hose having an end connected to said second fitting and an opposite end connected to said container.

4. The sprayer of claim 3 and further comprising:
    a bar pivotally mounted to said frame and extending forwardly therefrom.

5. The sprayer of claim 4 and further comprising:
    an arm having a proximal end pivotally mounted to said frame and a distal end with said dispenser mounted thereon.

6. The sprayer of claim 4 wherein:
    said plurality of rollers includes four rollers positioned equidistant from said axis of rotation with each roller angularly positioned every ninety degrees around said axis.

7. The sprayer of claim 6 wherein:
    said conduit and said rollers are nylon.

* * * * *